United States Patent
Tamjidi et al.

(10) Patent No.: US 10,558,671 B2
(45) Date of Patent: Feb. 11, 2020

(54) MODIFIED REPRESENTATIONAL STATE TRANSFER (REST) APPLICATION PROGRAMMING INTERFACE (API) INCLUDING A CUSTOMIZED GRAPHQL FRAMEWORK

(71) Applicant: ServiceNow, Inc., Santa Clara, CA (US)

(72) Inventors: David Tamjidi, San Diego, CA (US); Christopher Tucker, San Diego, CA (US); Carmine Mangione-Tran, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 15/968,508

(22) Filed: May 1, 2018

(65) Prior Publication Data
US 2019/0340287 A1   Nov. 7, 2019

(51) Int. Cl.
*G06F 17/30* (2006.01)
*G06F 16/2455* (2019.01)
(Continued)

(52) U.S. Cl.
CPC ........ *G06F 16/24568* (2019.01); *G06F 9/547* (2013.01); *G06F 16/212* (2019.01); *G06F 16/24566* (2019.01); *G06F 16/9024* (2019.01)

(58) Field of Classification Search
CPC .............. G06F 17/30516; G06F 9/547; G06F 17/30294; G06F 17/30513; G06F 17/30958
(Continued)

(56) References Cited

U.S. PATENT DOCUMENTS 9,172,621 B1 * 10/2015 Dippenaar .............. H04L 41/18
9,753,744 B1 *  9/2017 Wells ................... G06F 16/2423
(Continued)

OTHER PUBLICATIONS

"Using GraphQl client with REST API" Author: David C. pub online on Dec. 1, 2017. URL: https://medium.com/@dadc/using-graphql-client-with-rest-api-9c332e5c8eb3 (Year: 2017).*
(Continued)

*Primary Examiner* — Mark E Hershley
*Assistant Examiner* — Abdullah A Daud
(74) *Attorney, Agent, or Firm* — Fletcher Yoder, P.C.

(57) ABSTRACT

A system including a data center hosting a representational state transfer (REST) server in communication with a client network, wherein the REST server includes a GraphQL schema describing tables and fields of a communicatively coupled database. The REST server is configured to: receive a request that includes a GraphQL query; open a streaming connection to the client network; and output a beginning of a response via the streaming connection. The REST server is also configured to process the GraphQL query based on the GraphQL schema to generate a GraphQL result, and to output the GraphQL result in a body of the response via the streaming connection. The REST server is further configured to output an end of the response via the streaming connection, such that the response is correctly formatted in JavaScript Object Notation (JSON).

20 Claims, 12 Drawing Sheets

(51) Int. Cl.
  *G06F 16/21* (2019.01)
  *G06F 16/901* (2019.01)
  *G06F 9/54* (2006.01)

(58) Field of Classification Search
  USPC .......................................................... 707/774
  See application file for complete search history.

(56) References Cited

U.S. PATENT DOCUMENTS

| | | | | |
|---|---|---|---|---|
| 9,804,886 | B1* | 10/2017 | Wells | G06F 9/5033 |
| 9,836,504 | B2* | 12/2017 | Graefe | G06F 16/24542 |
| 2012/0265742 | A1* | 10/2012 | Burckhardt | G06F 9/466 |
| | | | | 707/694 |
| 2013/0232176 | A1* | 9/2013 | Plattner | G06F 16/21 |
| | | | | 707/803 |
| 2013/0338972 | A1* | 12/2013 | Chao | G06F 17/5009 |
| | | | | 703/1 |
| 2015/0161199 | A1 | 6/2015 | Pinko | |
| 2016/0226946 | A1* | 8/2016 | Karaatanassov | H04L 67/02 |
| 2016/0328424 | A1* | 11/2016 | Borley | G06F 16/81 |
| 2017/0257433 | A1* | 9/2017 | Rosa | H04L 67/1097 |
| 2017/0346875 | A1* | 11/2017 | Wells | H04L 65/80 |
| 2018/0032574 | A1 | 2/2018 | Vandenberg | |
| 2018/0068001 | A1* | 3/2018 | Panwar | G06F 9/54 |
| 2018/0239810 | A1* | 8/2018 | Pruitt | G06F 16/40 |
| 2019/0065500 | A1* | 2/2019 | Martin | G06F 16/951 |
| 2019/0196890 | A1* | 6/2019 | Bucchi | G06F 9/547 |

OTHER PUBLICATIONS

"Using GraphQl client with REST API" Author: David C. pub online on Dec. 1, 2017. URL: https://medium.com/@dadc/using-graphql-client-with-rest-api-9c332e5c8eb3 (Year: 2017).*

"How to wrap a REST API with GraphQL—A 3-step tutorial", pub online on Feb. 22, 2018. URL: https://www.prisma.io/blog/how-to-wrap-a-rest-api-with-graphql-8bf3fb17547d (Year: 2018).*

Masters Thesis tittle "Transformation of REST API to GraphQL for OpenTOSCA" by Eyob Semere Ghebremicael (Year: 2017).*

Falco Nogatz et al.; "Implementing GraphQL as a Query Langage for Deductive Databases in SWI-Prolog using DCGs, Quasi Quotations, and Dicts"; ARXIV.Org, Cornell University Library, Jan. 3, 2017, XP080739212; 15 pgs.

Extended European Search Report for European Patent Application No. 19169268.0 dated Oct. 2, 2019; 10 pgs.

* cited by examiner

```
query ($sys_id: String!) {
  GlideLayoutQuery {
    formLayout (formTableName: "incident", formViewName: "my_view", sys_id: $sys_id) {
      table
      elementsdata {
        name: elementName
      }
    }
    -graphql (queryGeneratorArguments: {name: "fields", value: "value, displayValue"}){
      _query
      _result (variables: [{name: "sys_id" value: $sys_id}])
      _variables
    }
  }
}
```
— 254

```
{
"data": {
  "GlideLayout_Query": {
    "formLayout": {
      "table": "incident",
      "elementsData": [
        {"name": "number"},
        {"name": "caller id"},
        {"name": "short description"}
      ],
      "_graphql": {
        "_query": "query ($sys_id: String) { GlideRecord_Query {__typename incident (sys_id:$sys_id) {__typename _rowCount _results { __typename sys_id { __typename value } sys_class_name {__typename value } number { __typename value displayValue } caller_id { __typename value displayValue } short_description { __typename value displayValue }} } }",
        "_result": "{\"data\":{\"GlideRecord_Query\":{\"__typename\":\"GlideRecord_QueryType\",\"incident\":{\"__typename\":\"GlideRecord_TableType_incident\",\"_rowCount\":1,\"_results\":[{\"__typename\":\"GlideRecord_TableResultsType_incident\",\"sys_id\":{\"__typename\":\"GlideRecord FieldType ID\",\"value\":\"1c741bd70b2322007518478d86373af3\"},\"sys_class_name\":{\"__typename\":\"GlideRecord_ChoiceListFieldType\",\"value\":\"incident\"},\"number\":{\"__typename\":\"GlideRecord_FieldType_String\",\"value\":\"INC0000060\",\"displayValue\":\"INC0000060\"}{\"caller id\"__typename\":\ \"GlideRecord_ReferenceFieldType_sys_user\",\"value\":\"681ccaf9c0a8016400b98a06818d57c7\",\"displayValue\":\"Joe Employee\"},\"short_despription\":{\"__typename\":\"GlideRecord_FieldType_String\",\"value\":\"Unable to connect to email\",\"displayValue\":\"Unable to connect to email\"}}]}}}",
        "_variables": [sys id]
      }
    }
  }
}
}
```

FIG. 10

MODIFIED REPRESENTATIONAL STATE TRANSFER (REST) APPLICATION PROGRAMMING INTERFACE (API) INCLUDING A CUSTOMIZED GRAPHQL FRAMEWORK

BACKGROUND

The present disclosure relates generally a representational state transfer (REST) system, and more specifically, to a modified REST application programming interface (API) that includes a customized GraphQL API framework.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Such cloud computing resources may include configuration management databases (CMDBs), which store information regarding Configuration Items (CIs), (e.g., manufacturer, vendor, location, and so forth), as well as alerts, service metrics, and maintenance status information related to these CIs. Certain CMDBs may include representational state transfer (REST) web services that enable client devices to access server-side resources based on a set of stateless operations that are defined by the REST application programming interface (API). REST servers generally utilize existing Hypertext Transfer Protocol (HTTP) methods (e.g., GET, POST) to receive and to respond to client requests to manipulate representations of resources. However, the standard REST API has particular limitations that can hinder application development.

In particular, it is presently recognized that the standard REST API lacks data types and data structures, which can result in confusion with respect to appropriate data formats during development. As such, an application developer may be responsible for determining data formats that a particular REST service expects to receive or will deliver. Additionally, the standard REST API does not support data hierarchy. As a result, a REST service can return a large volume of data, including undesired ancillary data that is several hierarchical levels below desired data. For example, a client device may want to present an identifier and a status associated with an incident (INT) within a CMDB. However, when the client device accesses corresponding REST service, the client device may also receive a large volume of unnecessary data (e.g., notes regarding the INT), which can substantially increase the processing, storage, and communication overhead of the operation. Furthermore, the standard REST API does not include robust support for versioning. That is, as a standard REST service is developed over time, each version of the REST service is typically defined as a separate REST endpoint (e.g., "api/now/table/v1", "/api/now/table/v2", "api/now/table/v3", and so forth). As such, once the various REST endpoints are brought online, it can be difficult to retire an older version in favor of a new version without potentially impacting the ability of client applications to function properly.

GraphQL is a publicly released query language available since 2015. See, e.g., https://graphql.org/. Compared to other query languages, GraphQL is hierarchical and generally enables queries to have greater specificity, which can substantially reduce overhead involving querying and transferring superfluous or undesired data. Additionally, GraphQL is a strongly typed query language, which enables developers to clearly define the data types for fields of a query. However, since GraphQL was designed as an alternative to using REST services, the standard REST API does not include support for GraphQL queries.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed toward a modified REST API that includes a customized GraphQL framework. The customized GraphQL framework enables clients to query substantially all of the tables and fields associated with a database server instance (e.g., storing CMDB data). More specifically, the modified REST API defines a GraphQL schema that enables users to use GraphQL to create customized queries. By implementing the customized GraphQL framework within the modified REST API, present embodiments enable users to define customized responses per query without writing scripts and/or implementing multiple scripted REST services to complete an operation. Present embodiments also enable the generation of rich and complex queries. For example, present embodiments enable the construction of multi-step GraphQL queries, including: nested queries (in which a first query can repeatedly generate and execute a second query), dependent queries (a nested query in which a current item in the first query is referenced by the second query), and recursive queries (in which a first query generates and executes a second query). As such, present embodiments, enable a single REST request to include a multi-step GraphQL query, such as a first query that determines form metadata and a second query that determines the actual form data, within the same REST request. Additionally, the disclosed modified REST API dramatically improves version control by enabling the dynamic recreation of the GraphQL schema as desired, such as when plug-ins with new schema pieces are added, or whenever a new field or table is added. Furthermore, the customized GraphQL framework of the modified REST API also enables query responses to be streamed, reducing peak memory usage of a client instance and/or REST server instance, potentially enabling a greater volume of work to be performed in parallel with reduced performance impact.

BRIEF DESCRIPTION OF THE DRAWINGS

Various aspects of this disclosure may be better understood upon reading the following detailed description and upon reference to the drawings in which:

FIG. 9 is an example of a recursive GraphQL query, in accordance with embodiments of the present technique;

FIG. 10 is a corresponding GraphQL response to the recursive GraphQL query of FIG. 9, in accordance with embodiments of the present technique;

DETAILED DESCRIPTION OF SPECIFIC EMBODIMENTS

Figure 1:
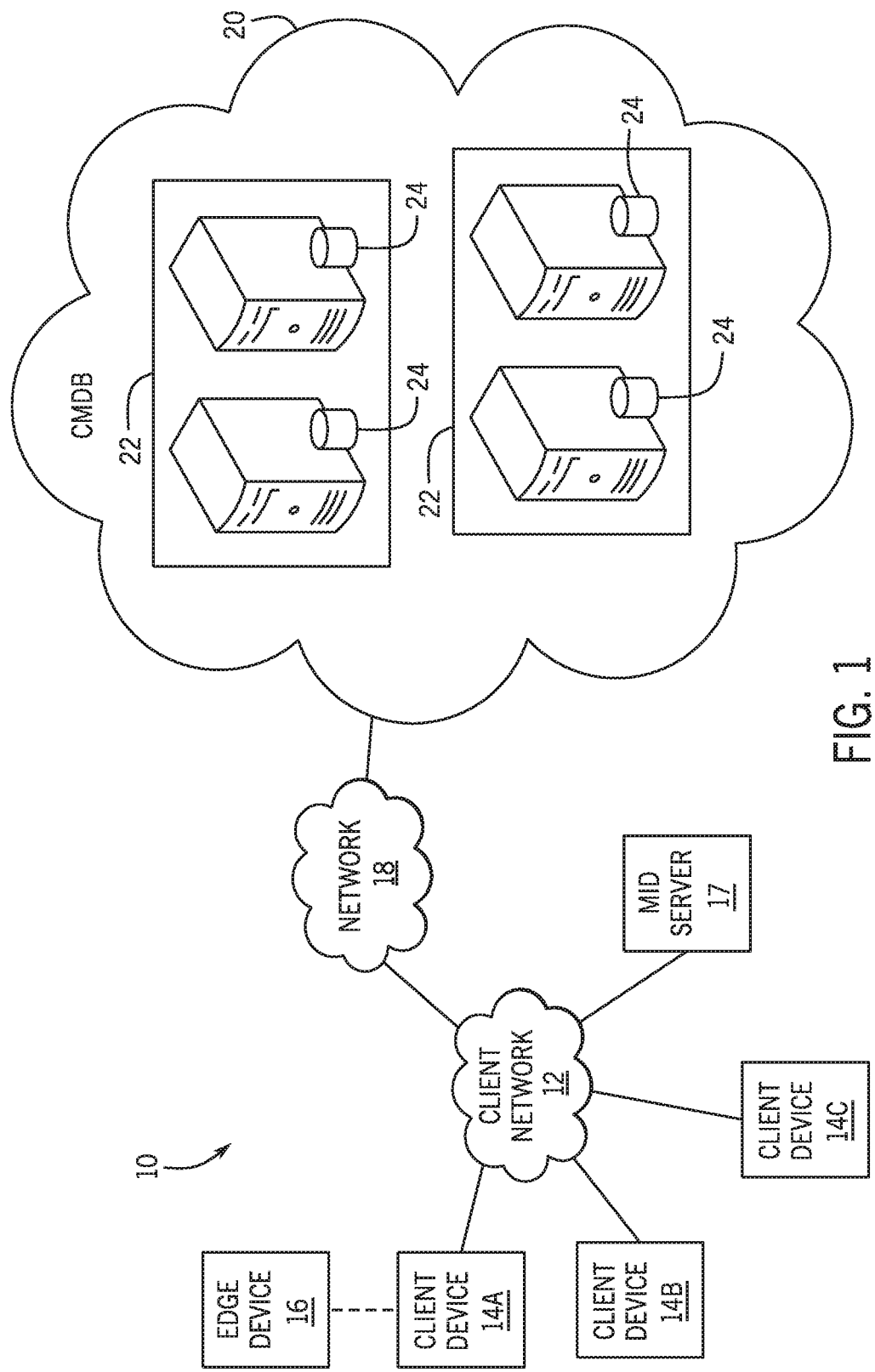
FIG. 1 is a block diagram of an embodiment of a cloud computing system in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to a single electronic computing device that includes, but is not limited to a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which all relevant data, such as manufacturer, vendor, location, or similar data, is stored in a CMDB.

As set forth above, it is presently recognized that the standard REST API is limited in terms of providing data types and data structures, enabling specific selection of hierarchical data, and providing an endpoint mechanism that enables more robust version support. It is also presently recognized that the standard GraphQL framework can be modified in a manner to address these issues, as well as provide additional features (e.g., response streaming, recursive queries, partial schemas based on access control lists (ACLs)) not present in the standard GraphQL framework. Furthermore, it is presently recognized that the standard REST API can be modified to include this customized GraphQL framework to provide a modified REST API that addresses the aforementioned limitations of, and provides the aforementioned benefits to, the modified REST system.

With this in mind, present embodiments are directed toward the aforementioned modified REST API that includes the customized GraphQL framework. The implementation of the customized GraphQL framework within the modified REST API enables querying of substantially all of the tables and fields associated with a database server instance (e.g., a database storing CMDB data), as well as substantially all of the metadata that describes these tables and fields using GraphQL. By enabling the use of the customized GraphQL framework within the REST API, customized queries, as well as customized responses per query, can be created without relying on scripts and/or implementing multiple scripted REST services to complete an operation, noting that scripted REST services are not commonly used outside of SaaS platforms. The customized GraphQL framework also enables the generation of rich and complex queries, including multi-step queries (e.g., nested queries, dependent queries, and/or recursive queries), within a single REST request. Additionally, the disclosed modified REST system also improves version control by enabling the dynamic recreation of the GraphQL schema as desired, and by enabling the use of a single GraphQL endpoint that is not version- or release-specific. Furthermore, the modified GraphQL framework of the modified REST system also enables query responses to be streamed, reducing peak memory usage of a client instance and/or REST server instance during operation.

Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and CMDB platform 20. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the CMDB platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the CMDB platform 20. FIG. 1 also illustrates that the client network 12 includes a management, instrumentation, and discovery (MID) server 17 that facilitates communication of data between the network hosting the CMDB platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, in order to transfer data between the client devices 14A-C and the network hosting the CMDB platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the CMDB platform 20 may be a remote network (e.g., a cloud network) that is able to communicate with the client devices 14A-C via the client network 12 and network 18. The network hosting the CMDB platform 20 provides additional computing resources to the client devices 14A-C and/or client network 12. For example, by utilizing the network hosting the CMDB platform 20, users of client devices 14A-C are able to build and execute applications, such as CMDBs or other automated processes for various enterprise, IT, and/or other organization-related functions, such as alert processing and handling. In one embodiment, the network hosting the CMDB platform 20 includes one or more data centers 22, where each data center could correspond to a different geographic location. Each of the data centers 22 includes a plurality of server instances 24 (also referred to herein as application instances or application server instances), where each server instance can be implemented on a physical computing system, such as a single electronic computing device (e.g., a single physical hardware server) or could be in the form a multi-computing device (e.g., multiple physical hardware servers). Examples of server instances 24 include, but are not limited to a web server instance (e.g., a unitary Apache installation), an application server instance (e.g., unitary Java® Virtual Machine), and/or a database server instance, e.g., a unitary MySQL® catalog (MySQL® is a registered trademark owned by MySQL AB A COMPANY).

To utilize computing resources within the CMDB platform 20, network operators may choose to configure the data centers 22 using a variety of computing infrastructures. In one embodiment, one or more of the data centers 22 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance and/or other combinations of server instances 24, such as one or more dedicated web server instances, one or more dedicated application server instances, and one or more database server instances, for each customer instance. In a multi-instance cloud architecture, multiple customer instances could be installed on a single physical hardware server, where each customer instance is allocated certain portions of the physical server resources, such as computing memory, storage, and processing power. By doing so, each customer instance has its own unique software stack that provides the benefit of data isolation, relatively less downtime for customers to access the CMDB platform 20, and customer-driven upgrade schedules. An example of implementing a customer instance within a multi-instance cloud architecture will be discussed in more detail below with reference to FIG. 2.

Figure 2:
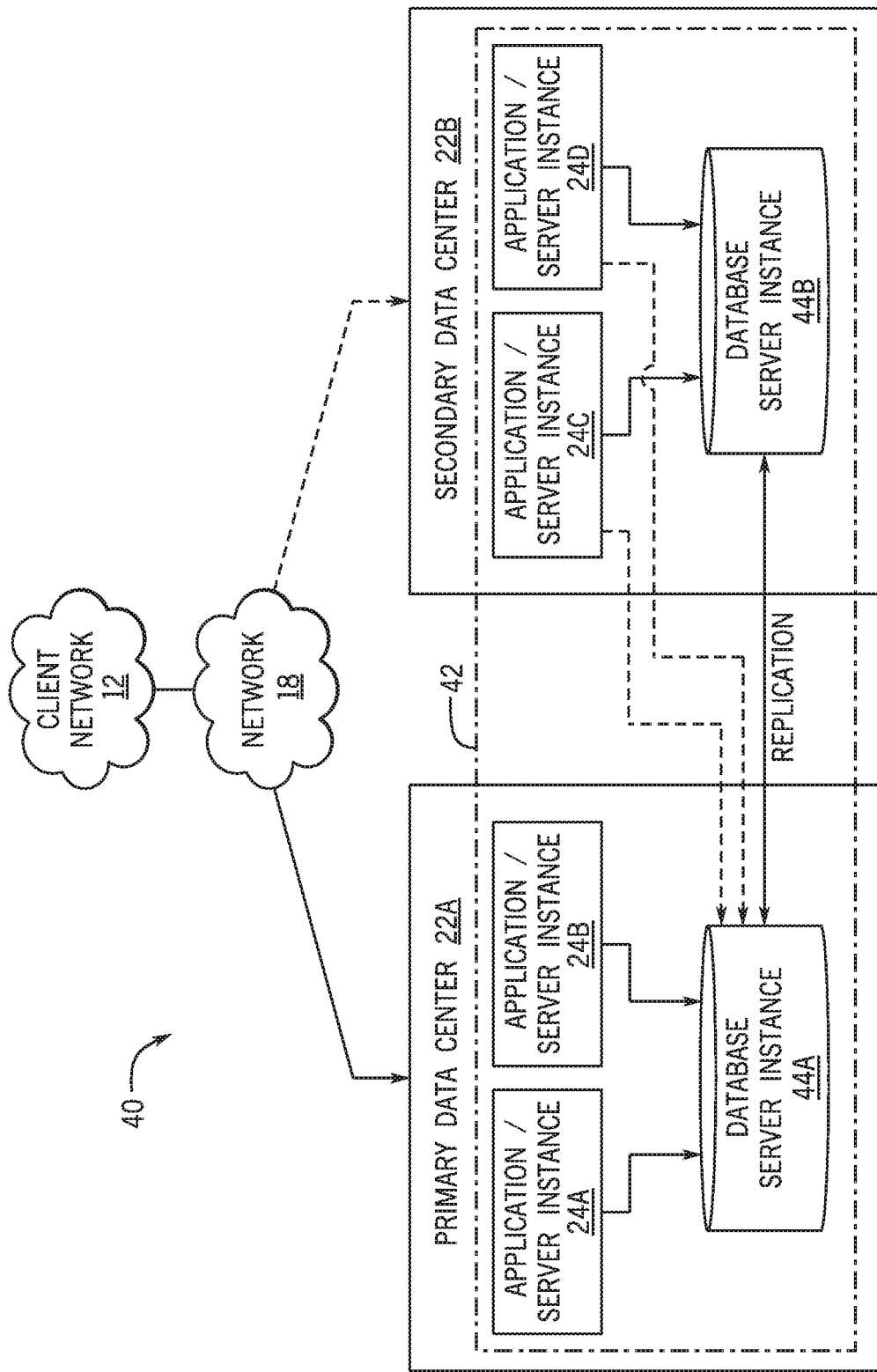
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two data centers 22A and 22B. Using FIG. 2 as an example, network environment and service provider cloud infrastructure client instance 42 (also referred to herein as a simply "client instance") is associated with (e.g., supported and enabled by) four dedicated application server instances 24A, 24B, 24C, and 24D and two dedicated database server instances 44A and 44B. Stated another way, the application server instances 24A-24D and database server instances 44A and 44B are not shared with other client instances. Other embodiments of the multi-instance cloud architecture 40 could include other types of dedicated server instances, such as a web server instance. For example, the client instance 42 could be associated with the four dedicated application server instances 24A-24D, two dedicated database server instances 44A and 44B, and four dedicated web server instances (not shown in FIG. 2).

To facilitate higher availability of the client instance 42, the application server instances 24A-24D and database server instances 44A and 44B are allocated to two different data centers 22A and 22B, where one of the data centers 22 acts as a backup data center. In reference to FIG. 2, data center 22A acts as a primary data center 22A that includes a primary pair of application server instances 24A and 24B and the primary database server instance 44A for the client instance 42, and data center 22B acts as a secondary data center 22B to back up the primary data center 22A for the client instance 42. To back up the primary data center 22A for the client instance 42, the secondary data center 22 includes a secondary pair of application server instances 24C and 24D and a secondary database server instance 44B. The primary database server instance 44A is able to replicate data to the secondary database server instance 44B.

As shown in FIG. 2, the primary database server instance 44A may replicate data to the secondary database server instance 44B using, e.g., a Master-Master My SQL Binlog replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the application server instances 24A and 24B and/or primary data server instance 44A fails and/or is under maintenance, data traffic for client instances 42 can be diverted to the secondary application server instances 24C and the secondary database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the CMDB platform 20 is implemented using data centers, other embodiments of the of the CMDB platform 20 are not limited to data centers and can utilize other types of remote network infrastructures. Moreover, other embodiments of the present disclosure may combine one or more different server instance into a single server instance. Using FIG. 2 as an example, the application server instances 24A-D and database server instances 44A and 44B may be combined into a single server instance. The use and discussion of FIGS. 1 and 2 are only examples to facilitate ease of description and explanation and are not intended to limit the disclosure to the specific examples illustrated therein.

Figure 3:
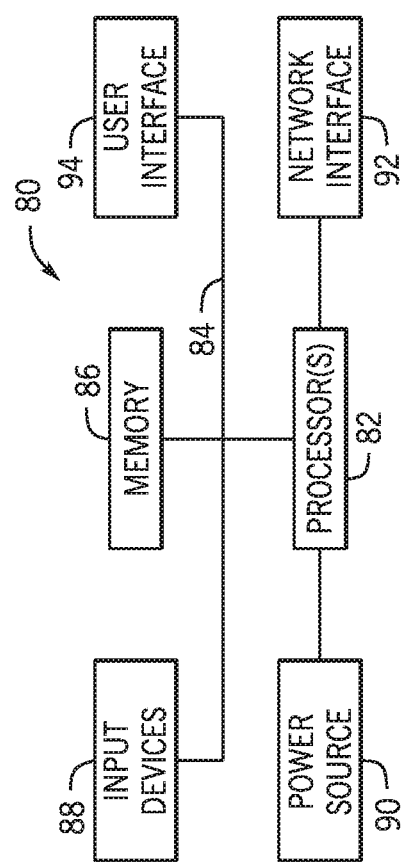
FIG. 3 is a block diagram of a computing device utilized in a computing system that may be present in FIG. 1 or 2, in accordance with embodiments of the present technique.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
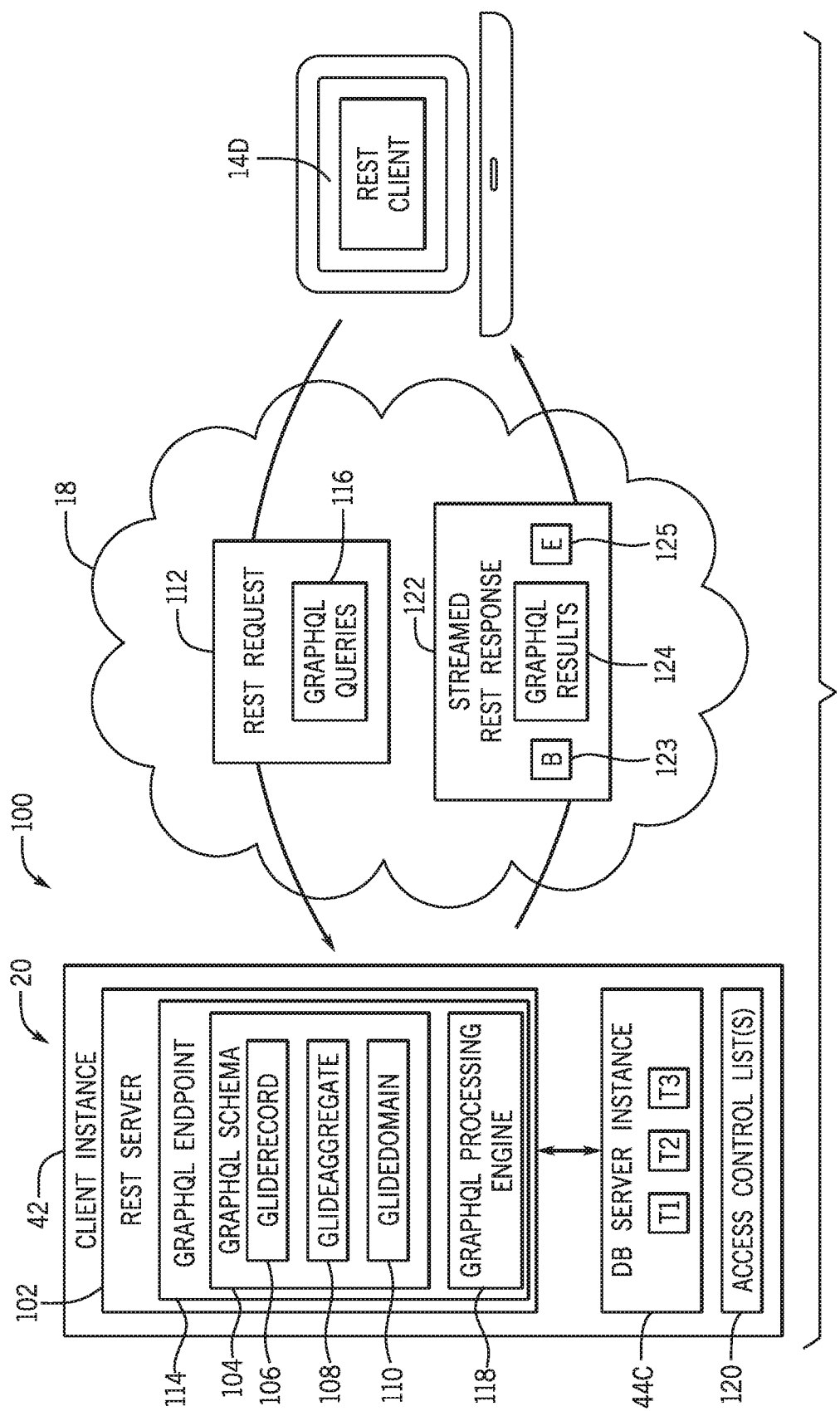
FIG. 4 is a block diagram of a modified REST system of a client instance, in accordance with embodiments of the present technique.

As mentioned above, present embodiments are directed toward a modified REST API that includes a modified GraphQL framework, which enables clients to develop complex queries with respect to substantially all of the tables and fields associated with a database instance (e.g., a database instance associated with a CMDB platform). With the foregoing in mind, FIG. 4 illustrates a modified REST system 100 (also referred to as simply "REST system") that implements the modified REST API having the customized GraphQL framework, in accordance with embodiments of the present technique. More specifically, FIG. 4 is a block diagram illustrating the REST system 100, which supports or enables the client instance 42, according to one or more disclosed embodiments. More specifically, FIG. 4 illustrates an example of a portion of a service provider cloud infrastructure, including the CMDB platform 20 discussed above. The CMDB platform 20 is connected to a client device 14D via the network 18 to provide a user interface to network applications executing within the client instance 42 (e.g., via a web browser of the client device 14D). Client instance 42 includes cloud resources and server instances similar to those explained with respect to FIG. 2, and is illustrated here to show support for the modified GraphQL functionality described herein within the client instance 42. Cloud provider infrastructures are generally configured to support a plurality of end-user devices, such as client device 14D, concurrently, wherein each end-user device is in communication with the single client instance 42. Also, cloud provider infrastructures may be configured to support any number of client instances, such as client instance 42, concurrently, with each of the instances in communication with one or more end-user devices. As mentioned above, an end-user may also interface with client instance 42 using an application that is executed within a web browser.

For the embodiment of the REST system 100 illustrated in FIG. 4, the client instance 42 is associated with at least one instance of a modified REST server 102 (also referred to herein as "server instance" or "REST server"), which may be an example of an application/server instance 24A-C illustrated in FIGS. 1 and 2, in accordance with the present technique. More specifically, the illustrated server instance 102 implements a modified version of the REST API that includes a customized version of a GraphQL framework to enable the functionality set forth herein. For example, the illustrated server instance 102 includes a GraphQL schema 104, which may also be referred to herein as a combined or global GraphQL schema. More specifically, the GraphQL schema 104 is generated from a number of sub-schemas at run-time, and may be dynamically regenerated from these sub-schemas at any suitable point thereafter. For the illustrated embodiment, the GraphQL schema 104 is generated from a GlideRecord sub-schema 106, a GlideAggregate sub-schema 108, and a GlideDomain sub-schema 110 at run-time of the instance of the server instance 102. For the illustrated example, the GlideRecord sub-schema 106 is a GraphQL implementation of the GlideRecord API, which is part of the JavaScript API that is used for database operations. Additionally, the GlideAggregate sub-schema 108 is a GraphQL implementation of the REST Aggregation API, while the GlideDomain sub-schema 110 is a collection of objects that can be used by multiple developers to avoid duplication. It may be appreciated that, in certain embodiments, the server instance 102 may support at least one mechanism (e.g., a Glide platform plug-in extension mechanism) to enable a user or client to develop customized Java®-based sub-schemas that may be combined as part of the GraphQL schema 104. It may also be appreciated that each sub-schema may be validated for performance and to avoid name space collisions before these sub-schemas are merged into the combined GraphQL schema 104, as discussed below.

For the embodiment illustrated in FIG. 4, the client device 14D provides REST request 112 (hereinafter "request 112") to the server instance 102 that is associated with the client instance 42. More specifically, the client device 14D uses a suitable HTTP method to submit the request 112 to a GraphQL endpoint 114 (e.g., "/api/now/graphql") associated with the server instance 102. It may be noted that a standard REST endpoint is generally designed to return results of a particular query, such as a query to determine information regarding an incident (INT) stored in one or more database tables (e.g., tables T1, T2, T3) of a database server instance 44C associated with the client instance 42. In contrast, the disclosed GraphQL endpoint 114 is designed to receive the request 112 via an HTTP POST, wherein the request 112 includes one or more GraphQL queries 116. Unlike a standard REST endpoint, the disclosed GraphQL endpoint 114 can be configured to receive different requests 112 including different GraphQL queries 116. Additionally, the GraphQL endpoint 114 is associated with the GraphQL schema 104, such that the same GraphQL endpoint 114 may be used even as the GraphQL schema 104 is updated over time, substantially improving version control issues compared to endpoints of the standard REST API. As such, the disclosed GraphQL endpoint 114 substantially simplifies application design and version control by enabling client devices (e.g., client device 14D) to provide each request 112 to the same GraphQL endpoint 114, which is not tied to a particular release or version.

For the embodiment illustrated in FIG. 4, after receiving the request 112, a GraphQL processing engine 118 of the server instance 102 executes the GraphQL queries 116 against tables (e.g., tables T1, T2, T3) of the database server instance 44C, as discussed in greater detail below. As discussed below, the server instance 102 provides a streamed REST response 122 (hereinafter "streamed response") to the client device 14D based on the execution of the GraphQL queries 116 of the request 112. As illustrated, the streamed response 122 includes one or more sets of GraphQL results 124, which include data collected by execution of the GraphQL queries 116 of the request 112. More specifically, the streamed response 122 includes: a beginning portion 123 (e.g., including one or more headers), a body or payload portion that includes the GraphQL results 124, and an end portion 125. As discussed, the streamed response 122, including the beginning portion 123, the GraphQL results 124 of the body portion, and the end portion 125, are all in a valid notation (e.g., JSON), regardless of errors encountered during the execution of the GraphQL queries 116. Additionally, in certain embodiments, the server instance 102 may control execution the GraphQL queries 116 in accordance with one or more access control lists (ACLs) 120 associated with the client instance 42. In certain embodiments, these ACLs may be stored as tables within the database server instance 44C.

Figure 5:
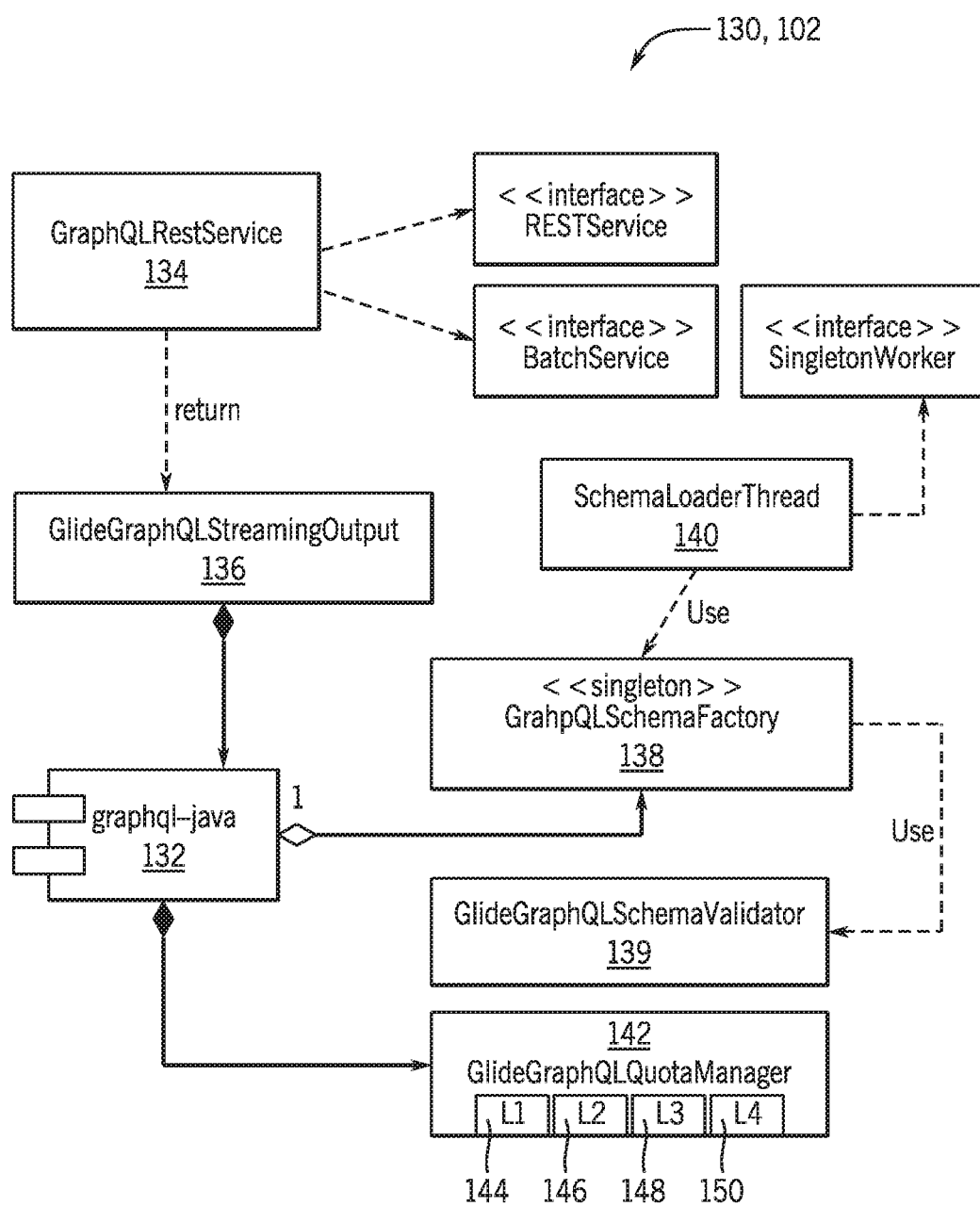
FIG. 5 is a block diagram illustrating a number of components of the REST server of the modified REST system, in accordance with embodiments of the present technique.

FIG. 5 is a block diagram 130 illustrating a number of components of the instance of the REST server 102 of FIG. 4, in accordance with an embodiment of the present approach. It may be appreciated that, while the present embodiment is described as being implemented in Java®, in other embodiments, other programming languages may be used in accordance with the present disclosure. The illustrated embodiment of the server instance 102 includes a graphql-java module 132, which is a central component used to implement the GraphQL processing engine 118. In certain embodiments, the graphql-java module 132 is based on or derived from a 3rd party open-source framework, such as the GraphQL Java® Framework available online (see, e.g., https://github.com/graphql-java/graphql-java). The graphql-java module 132 is generally responsible for processing and verifying the GraphQL queries 116 of each received request 112 against the GraphQL schema 104. It may be noted that graphql-java module 132 is modified and customized to include features and functionality not present within the standard 3rd party open-source framework, for example, to enable streaming support, to enable support for multi-step GraphQL queries, and to modify data structure to reduce a size of the GraphQL schema 104 in memory of a computing system associated with the server instance 102 and/or client instance 42.

The illustrated embodiment of the server instance 102 also includes a GraphQLRestService module 134, which is a REST endpoint implementation class for GraphQL. Accordingly, the illustrated GraphQLRestService module 134 supports a RESTService and a BatchService interface, generally serves as a gateway to the GraphQL infrastructure in the system. For example, the GraphQLRestService module 134 processes the received request 112, particularly when the request 112 includes GraphQL queries 116. Additionally, for the illustrated embodiment, the GraphQLRestService module 134 processes the request 112 by creating an instance of a GlideGraphQLStreamingOutput class 136 that is returned to the REST API infrastructure to facilitate providing the streamed response 122.

The GlideGraphQLStreamingOutput class 136 of the illustrated embodiment is an implementation of the StreamingOutput interface of the standard Java® API. The GlideGraphQLStreamingOutput class 136 correctly generates the initial JSON structure of the REST response 122 (when handling batched queries) before sending the request 112 with the GraphQL queries 116 to the graphql-java module 132 for execution. Additionally, for the illustrated embodiment, the GlideGraphQLStreamingOutput class 136 also opens an OutputStream that is passed to the graphql-java module 132 such that the graphql-java module 132 can stream the data associated with the streamed response 122 directly, without storing intermediary results in memory until execution of the GraphQL queries 116 is complete.

The illustrated embodiment of the server instance 102 also includes a GraphQLSchemaFactory class 138 that collects all the sub-schemas from applicable plug-ins which support a particular extension point (e.g., "com.glide.graphql.datasource"). The GraphQLSchemaFactory class 138 performs validation on each sub-schema (e.g., sub-schemas 106, 108, and 110 of FIG. 4) using the GlideGraphQLSchemaValidator class 139 to ensure performance characteristics are met before merging the sub-schemas into one final schema (e.g., combined GraphQL schema 104) for use by the graphql-java module 132. Additionally, the GraphQLSchemaFactory class 138 caches the GraphQL schema 104 after creation to allow it to be re-used by multiple requests without being rebuilt each time. It may be noted that introspective GraphQL requests may have their own access control list (ACL) filtered schema that is created on-demand and is not cached, as discussed below.

The illustrated embodiment of the server instance 102 also includes a SchemaLoaderThread class 140, which supports a SingletonWorker interface, and is designed to be a background thread which runs at startup of the server instance 102. For the illustrated embodiment, the SchemaLoaderThread class 140 creates the overall schema using the GraphQLSchemaFactory class 138 during startup of the server instance 102, as well as whenever the GraphQL schema 104 needs to be recreated due to database changes (e.g., the addition/removal of one or more tables or fields, the activation/deactivation of certain plug-ins). In certain embodiments, the SchemaLoaderThread class 140 includes special logic to handle zboot and upgrade scenarios.

The illustrated embodiment of the server instance 102 also includes a GlideGraphQLQuotaManager class 142. The GlideGraphQLQuotaManager class 142 handles the different execution limits that the disclosed GraphQL infrastructure supports to minimize system resources during execution. For the illustrated embodiment, the limits include: an execution time limit 144, an execution node output limit 146, an execution database query limit 148, and a maximum query depth limit 150, which are discussed in greater detail with respect to FIG. 7. For example, the execution time limit 144 limits total execution time of the GraphQL queries 116 of a request 112, and may be set by system property "glide.graphql.max.execution.time" with default value of 90 seconds. The execution node output limit 146 limits total query execution node output to limit the total streamed output size, and may be set by system property "glide.graphql.max.execution.nodes" with default value of unlimited. The execution database query limit 148 limits total database queries, and may be set by system property "glide.graphql.max.execution.database.queries" with default value of 1000 queries. The maximum query depth limit 150 limits how many nested levels the GraphQL queries 116 can include, and may be set by system property "glide.graphql.max.query.depth" with default value of 30. In other embodiments, the limits 144, 146, 148, and/or 150 may be set using different system properties and may have other values. In still other embodiments, the GlideGraphQLQuotaManager class 142 may support different types of limits than those illustrated in FIG. 5.

Figure 6:
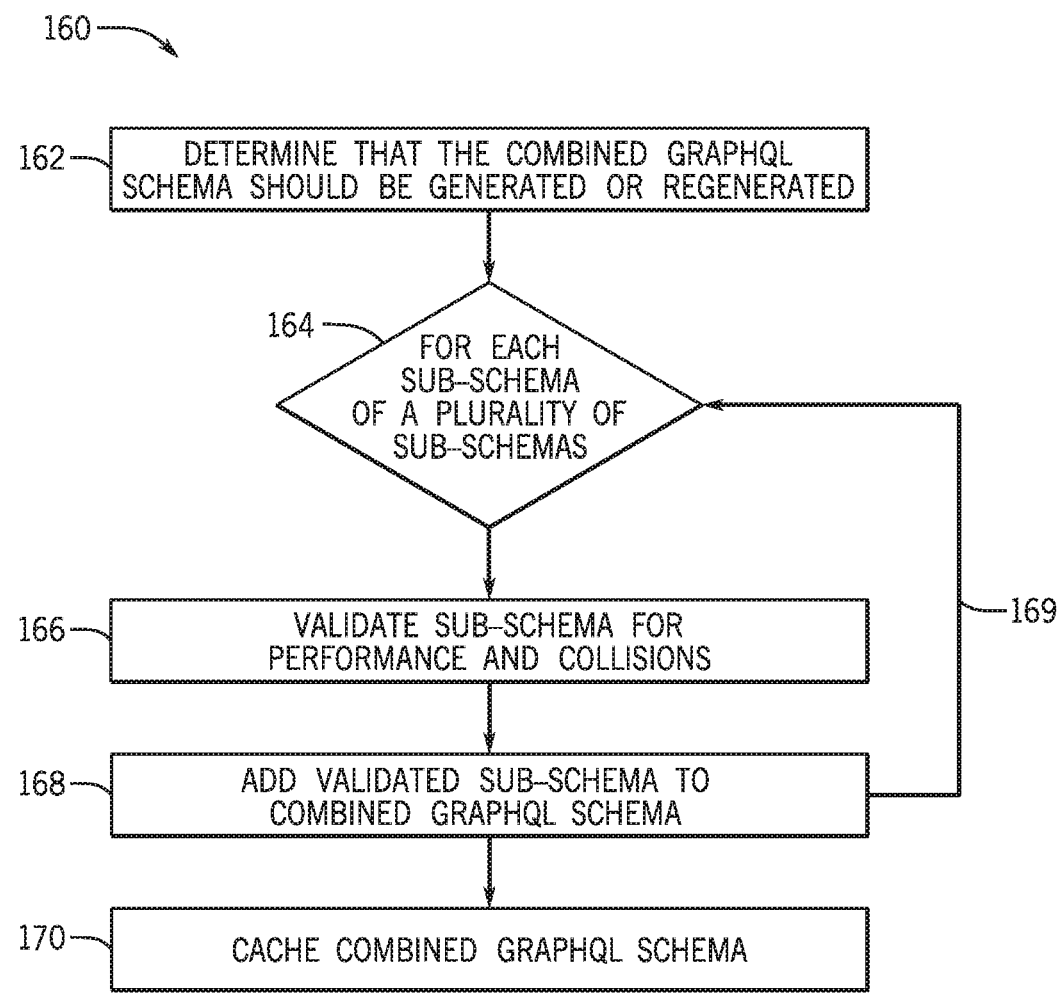
FIG. 6 is a flow diagram illustrating a process whereby the REST server of the modified REST system generates a combined GraphQL schema from a plurality of sub-schemas, in accordance with embodiments of the present technique.

FIG. 6 is a flow diagram that illustrates a process 160 whereby the instance of the REST server 102 generates the GraphQL schema 104, in accordance with embodiments of the present approach. As such, the process 160 may be stored as instructions in a suitable medium (e.g., memory 86) and executed by suitable processor (e.g., processors 82) associated with the computing system 80 of FIG. 3. Additionally, the illustrated process 160 is provided merely as an example, and in other embodiments, the process 160 may include additional steps, fewer steps, repeated steps, and/or steps performed in different orders than the steps of the example process 160 of FIG. 6.

For the illustrated embodiment, the process 160 begins with the server instance 102 determining (block 162) that the combined GraphQL schema should be generated or regenerated. For example, the server instance 102 determines that the combined GraphQL schema should be generated at start-up, such as when the server instance 102 is created within the client instance 42. Additionally, in certain embodiments, the server instance 102 also determines that the combined GraphQL schema should be regenerated in response to a change in one or more of the sub-schemas (e.g., the GlideRecord sub-schema 106, the GlideAggregate sub-schema 108, and the GlideDomain sub-schema 110). These sub-schemas may be updated in response to changes to the tables (e.g., tables T1, T2, and T3) or plug-ins associated with the database server instance 44C illustrated in FIG. 4.

By way of specific example, the server instance 102 determines that the combined GraphQL schema 104 should be regenerated when fields are added to, or removed from, the tables T1, T2, and T3, when tables T1, T2, or T3 are added or removed from the database server instance 44C, and when plug-ins are added/removed that are associated with a customized sub-schema. In certain embodiments, the server instance 102 regenerates the combined GraphQL schema 104 in response to a cache flush of SYS_DICTIONARY, which is an indication that a new table or field added to the database server instance 44C. In certain embodiments, the server instance 102 regenerates the combined GraphQL schema 104 in response to the activation of a new plug-in having a GraphQL extension, which can include additional sub-schemas (e.g., additional schema items/pieces) to be added to the combined GraphQL schema 104. As such, in certain embodiments, the combined GraphQL schema 104 associated with the client instance 42 is dynamically modified in response to activating/deactivating plug-ins within the client instance 42 having GraphQL extensions. In certain embodiments, when server instance 102 determines that the GraphQL schema 104 is to be regenerated, the server instance 102 may delete or clear the GraphQL schema 104 from memory and/or cache as part of the actions of block 162 before regenerating the combined GraphQL schema 104.

Continuing through the embodiment of the process 160 illustrated in FIG. 6, the server instance 102 subsequently performs a series of steps for each sub-schema of the plurality of sub-schemas associated with the server instance 102, as indicated by the blocks 164, 166, 168, and arrow 169. For example, the server instance 102 illustrated in FIG. 4 performs these steps for each of the GlideRecord sub-schema 106, the GlideAggregate sub-schema 108, and the GlideDomain sub-schema 110. Within this for loop, the server instance 102 first validates each sub-schema for performance and collisions, as indicated in block 166, and then adds each validated sub-schema to the combined GraphQL schema 104, as indicated in block 168. For example, to validate a sub-schema for performance, the server instance 102 may ensure that certain data structures are used to avoid undesired overhead in the combined GraphQL schema 104. To validate a sub-schema for collisions is to ensure that there are not GraphQL field name and/or GraphQL object type name collisions.

The embodiment of the process 160 illustrated in FIG. 6 concludes with the server instance 102 caching (block 170) the combined GraphQL schema. While this step may not be performed in all embodiments, it is presently recognized that there is a substantial performance advantage in the operation of the server instance 102 when the combined GraphQL schema is cached for quick access, such that the GraphQL processing engine 118 can efficiently handle each request 112 that includes GraphQL queries 116. Accordingly, once the combined GraphQL schema 104 has been generated or regenerated, the server instance 102 is ready to being processing such requests 112, as discussed below.

Figure 7:
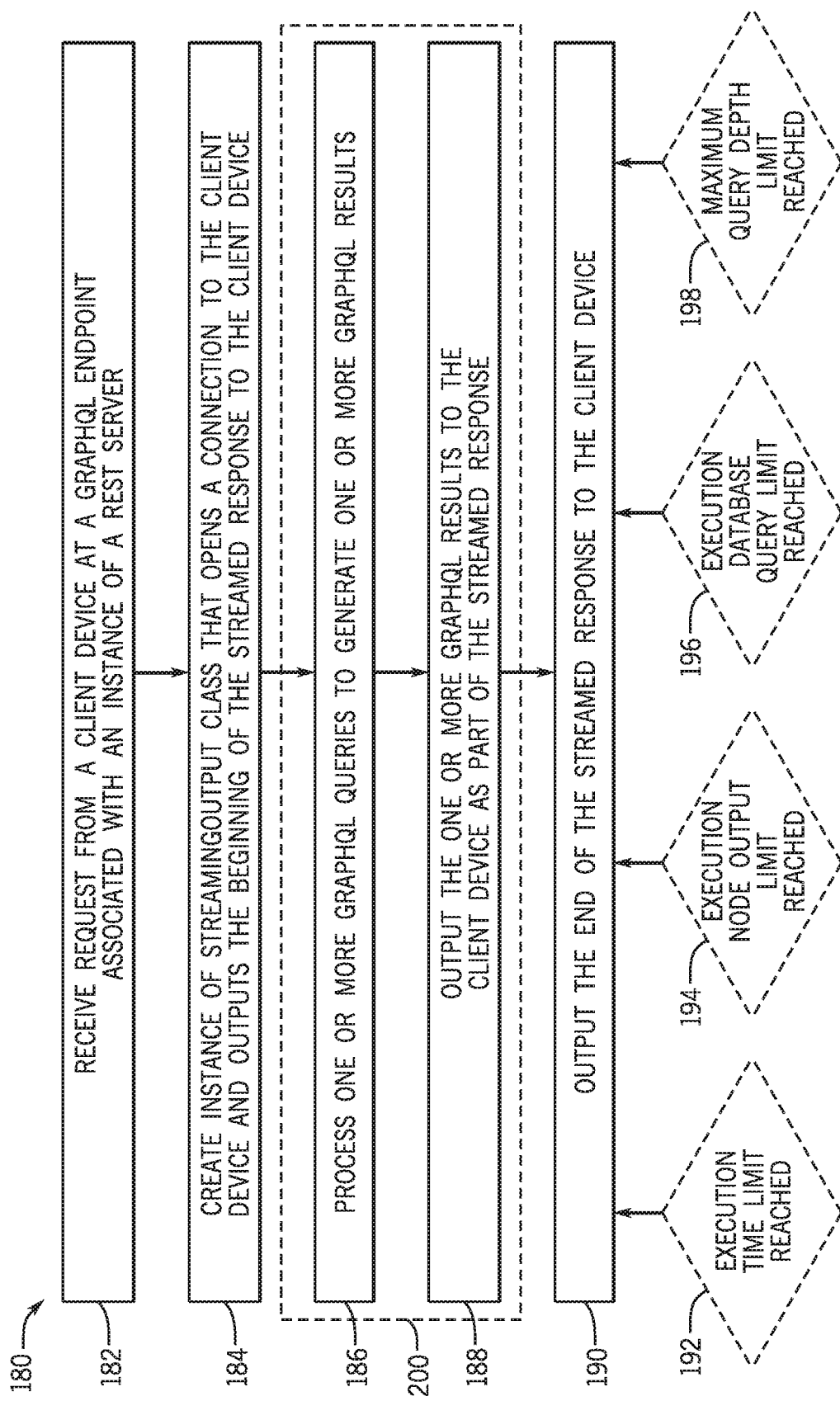
FIG. 7 is a flow diagram illustrating a process whereby a GraphQL processing engine of the REST server handles a request that includes a GraphQL query, in accordance with embodiments of the present technique.

FIG. 7 is a flow diagram illustrating a process 180 whereby the instance of the REST server 102, and more specifically the GraphQL processing engine 118 of the server instance 102, handles each request 112 that includes GraphQL queries 116, in accordance with embodiments of the present technique. As such, the process 180 may be stored as instructions in a suitable medium (e.g., memory 86) and executed by a suitable processor (e.g., processor 82) associated with the computing system 80 of FIG. 3. Additionally, the illustrated process 180 is provided merely as an example, and in other embodiments, the process 180 may include additional steps, fewer steps, repeated steps, and/or steps performed in different orders than the steps of the example process 180 of FIG. 7. It may be noted that the process 180 is discussed with reference to elements illustrated in FIG. 4, discussed above.

The embodiment of the process 180 illustrated in FIG. 7 begins with the GraphQL processing engine 118 receiving (block 182) a request 112 from a client device 14D. More specifically, as illustrated in FIG. 4, the request 112 is received at the GraphQL endpoint 114 associated with the server instance 102. For example, the GraphQL processing engine 118 associated with the server instance 102 receives, at the GraphQL endpoint (e.g., "/api/now/graphql"), the request 112 that includes one or more GraphQL queries 116.

Continuing through the embodiment of the process 180 illustrated in FIG. 7, the GraphQL processing engine 118 responds to the received request 112 by first creating (block 184) an instance of a StreamingOutput class that opens a connection to the client device 14D. Additionally, the GraphQL processing engine 118 outputs the beginning 123 (e.g., one or more headers) of the streaming response 122 to the client device via the new StreamingOutput class instance. The instance of the StreamingOutput class enables the server instance 102 to provide the streamed response 122 to the client device 14D. It may also be appreciated that the outputting of block 184 is part ensuring that the streamed response 122 is a valid JSON response, regardless of errors encountered during the processing of the GraphQL queries 116 of the request 112.

Continuing through the embodiment of the process 180 illustrated in FIG. 7, the GraphQL processing engine 118 processes (block 186) the one or more GraphQL queries 116 included in the request 112 to generate one or more sets of GraphQL results 124 that are streamed to the client device 14D. For example, this may first involve the GraphQL processing engine 118 validating each of the GraphQL queries 116 against the GraphQL schema 104 to ensure that all of the terms (e.g., fields, tables, metadata) described in the GraphQL query are defined in the schema. In certain embodiments, when a GraphQL query cannot be validated against the GraphQL schema, the GraphQL processing engine 118 may discontinue further processing of the request 112, similar to the limit-based error handling discussed below. In certain embodiments, when a user is not authorized in ACLs to access particular tables or fields indicated the one or more GraphQL queries 116, but the tables or fields can be validated against the GraphQL schema 104, the GraphQL processing engine 118 may generate a partially incomplete or censored (potentially empty or null) GraphQL result as part of the GraphQL results 124, such that the streamed response 122 includes only information related to tables and fields accessible by the requesting user.

Additionally, the GraphQL processing engine 118 outputs (block 188) the one or more sets of GraphQL results 124 to the client device as a body or payload of the streamed response 122 via the instance of the StreamingOutput class created in block 184. It may be appreciated that, for efficiency, the steps of blocks 186 and 188 may be performed together in certain embodiments. For example, in certain embodiments, the GraphQL processing engine 118 processes a first of the GraphQL queries 116 and then streams a corresponding GraphQL result of the streamed response 122 before proceeding to processes a second of the GraphQL queries 116 of the request 112. For such embodiments, it may be appreciated that, by processing and then streaming each of the GraphQL queries 116 in such a serialized manner, fewer total memory resources are consumed compared to storing each of the one or more GraphQL result sets in memory before being output to the client device 14D in bulk. That is, once a particular GraphQL result has been streamed to the client device 14D, the server instance 102 may free or reallocate memory space (e.g., in memory 86) storing data associated with the particular GraphQL result. Additionally, the GraphQL processing engine 118 ensures that the one or more GraphQL results 124 of the streamed response 122 are output to the client device 14D in valid JSON. Finally, the illustrated embodiment of the process 180 concludes with the GraphQL processing engine 118 outputting (block 190) the end 125 (e.g., one or more footers) of the streamed response 122 in valid JSON to the client device 14D via the instance of the StreamingOutput class.

Additionally, the embodiment of the process 180 illustrated in FIG. 7 includes error handling, as indicated by the dashed decision blocks 192, 194, 196, and 198. That is, as generally indicated by the dashed block 200, during the execution of blocks 186 and/or 188, one or more errors may be generated or encountered that may interfere with the ability of the GraphQL processing engine 118 to fully or correctly process the GraphQL queries 116 of the request 112. When such an error is encountered during processing of one or more of the GraphQL queries (block 186) or during outputting of the one or more sets of GraphQL results (block 188), the GraphQL processing engine 118 responds by outputting (block 190) the end 125 (e.g., one or more footers) of the streamed response 122 in valid JSON to the client device via the instance of the StreamingOutput class.

For the embodiment of the process 180 illustrated in FIG. 7, if or when the GraphQL processing engine 118 determines that the execution time limit 144 has been reached (block 192), the execution node output limit 146 has been reached (block 194), the execution database query limit 148 has been reached (block 196), or the maximum query depth limit 150 has been reached (block 198), then the GraphQL processing engine 118 responds by discontinuing execution of the GraphQL queries 116 and outputting (block 190) the end 125 (e.g., suitable closing notation/syntax) of the streamed response 122 in valid JSON to the client device 14D. These limits may be associated with system properties, as discussed above with respect to FIG. 5.

Figure 8:
FIG. 8 is a simulated screenshot of a GraphQL client application executing on a client device, in accordance with embodiments of the present technique.

FIG. 8 is a simulated screenshot of a GraphQL client application 210 executing on a client device (e.g., client device 14D), in accordance with embodiments of the present technique. FIG. 8 is described with particular reference to FIG. 4, discussed above. As noted, a request 112 that includes one or more GraphQL queries 116 may be generated to by a client device 14D to populate elements of a user interface presented on a display of the client device 14D. As an alternative, the GraphQL client application 210 illustrated in FIG. 8 represents a development tool that enables a user to prepare and submit a request 112 (e.g., via client device 14D) that includes one or more GraphQL queries 116 to a particular GraphQL endpoint 114 associated with the REST server 102 of a client instance 42. In general, the illustrated embodiment of the GraphQL client application 210 includes a first text area 212 that is used to prepare a GraphQL query 214, which may be one of the GraphQL queries 116 that is part of the request 112 illustrated in FIG. 4. As discussed, once prepared, the GraphQL client application 210 of FIG. 8 provides the request 112 to the indicated GraphQL endpoint 114. Additionally, the GraphQL client application 210 includes a second text area 216 that is used to present a GraphQL result 218, which may be one of the sets of GraphQL results 124 returned as part of the streamed response 122 illustrated in FIG. 4.

It may be appreciated that one advantage of implementing the modified GraphQL framework in the disclosed REST system 100 is that it enables introspective queries of the GraphQL schema 104. For example, when a user is preparing the GraphQL queries in the first text area 212, the GraphQL client application 210 may introspectively query the GraphQL schema 104 to determine which tables or fields are available to be referenced by the query. In particular, for certain client devices and/or applications, the GraphQL schema 104 may be downloaded to the client device 14D from the server instance 102 to enable local introspection of the combined GraphQL schema 104. Furthermore, in certain embodiments, when the GraphQL client application 210 requests the GraphQL schema 104, the server instance 102 may provide a portion or a subset of the global GraphQL schema 104 (e.g., a private, filtered, or user GraphQL schema) that is dynamically generated upon request based on the rights of the user, as indicated in the ACLs 120 associated with the client instance 42. That is, to enhance security in certain embodiments, a user of the client device 14D may be provided an ACL-filtered (or ACL-censored) GraphQL schema that is generated on-demand and that only includes information regarding tables and fields of the database server instance 44C that the user of the client device 14D is authorized to access.

It may also be noted that introspective querying enables the GraphQL client application 210 to provide recommendations to the user with respect to the names of particular tables and fields that can be queried. For example, in certain embodiments, the GraphQL client application 210 downloads and introspectively queries at least a portion of the GraphQL schema 104. As the user enters the GraphQL query 214, in certain embodiments, the first text area 212 may provide recommendations via drop-down lists and/or as auto-completion text. By way of specific example, when the user enters one or more characters that indicate that the user is attempting to type a particular table or field as part of the GraphQL query 214, then the first text area 212 may be modified to present, in a drop down list that is superimposed near the cursor, one or suggestions of the names of suitable tables or fields that are available to be queried by the user from the downloaded portion of the GraphQL schema 104. Accordingly, this functionality enables the user to more quickly, easily, and accurately prepare the GraphQL query 214.

Once the request 112 including the GraphQL query 214 has been prepared in the first text area 212, the user may select an HTTP method (e.g., POST) using the drop-down box 220, and then submit the GraphQL query 214 as part of the request 112 to the GraphQL endpoint 114. The GraphQL client application 210 subsequently receives and presents the GraphQL result 218 as part of the streamed response 122. For the example GraphQL query 214 and GraphQL result 218 illustrated in FIG. 8, the GraphQL query 214 requests a rowCount 222 for incidents (INTs) that are active, as well as the values assigned to particular fields associated with these results. Specifically, the illustrated GraphQL query 214 includes a "short_description" field 224, a "displayValue" field 226, a "name" field 228, a "first_name" field 230, and a "last_name" field 232, among others. Accordingly, the illustrated GraphQL result 218 includes values that correspond to the requested data, including the rowCount value 234, the "short_description" value 236, the "displayValue" value 238, the "name" value 240, the "first_name" value 242, the "last_name" value 244, among others. Furthermore, the illustrated GraphQL result 218, as well as the rest of the streamed response 122 (not illustrated in FIG. 8), is in valid JSON, as set forth above.

Additionally, it may be appreciated that another advantage of implementing the customized GraphQL framework in the disclosed REST system 100 is to enable the creation of multi-step GraphQL queries. These multi-step GraphQL queries include and/or generate multiple queries in different manners and enable different advantages. A simple multi-step GraphQL query may include a number of independent GraphQL queries 116 that are processed by the GraphQL processing engine 118 in a serialized fashion (e.g., one after another), and the GraphQL results 124 are streamed to the client device 14D and released from memory as they are generated. In terms of complex multi-step queries, the disclosed modified GraphQL framework supports recursive, nested, and dependent GraphQL queries, as discussed below.

For example, the GraphQL query may be a recursive multi-step GraphQL query, in which a first portion can execute and stream data from an automatically generated second portion of the query. For example, in a recursive GraphQL query, a first portion can be executed that generates a second, static query that can be executed outside of the context of the first query, wherein this second query can optionally be automatically invoked as part of executing the first query. As such, recursive GraphQL queries are useful for constructing data queries using information that is only available server-side. For example, within a multi-step recursive query, after the first portion of a GraphQL query is executed by the GraphQL processing engine 118, the second portion of the GraphQL query is defined "on-the-fly" based on the results of the execution of the first query, and then the GraphQL processing engine 118 may again be invoked to execute the second portion of the GraphQL query.

An example of a multi-step recursive GraphQL query 250 is illustrated in FIG. 9, and the corresponding GraphQL response 252 is illustrated in FIG. 10. The example multi-step recursive GraphQL query 250 includes a first portion 254 that is executed to retrieve information about the structure of an "incident" table, and the corresponding information is returned as a portion 255 of the GraphQL response 252. The multi-step recursive GraphQL query 250 also includes a second portion 256 that generates a new, internal GraphQL query 257, which is also returned as part of the GraphQL response 252. Furthermore, this internal GraphQL query 257 is also executed, and the GraphQL response 252 includes the JSON-escaped results 258 of this execution. As such, for the illustrated example, the first portion 254 retrieves the structure of the "incident" table, while the second portion 256 retrieves data stored within the table.

In a nested multi-step GraphQL query, a second, inner query is repeatedly generated and executed by a first, outer query. A dependent multi-step GraphQL query is a type of nested multi-step GraphQL query in which the inner query references data from the outer query. As such, for a dependent GraphQL query, the inner query can be executed in the dynamic context of the outer query, with access to its corresponding data, for example, to enable traversal of foreign key relations in the relational schema in both a 1-to-many and a many-to-1 direction, which is useful for contextualized data navigation.

Figure 11:
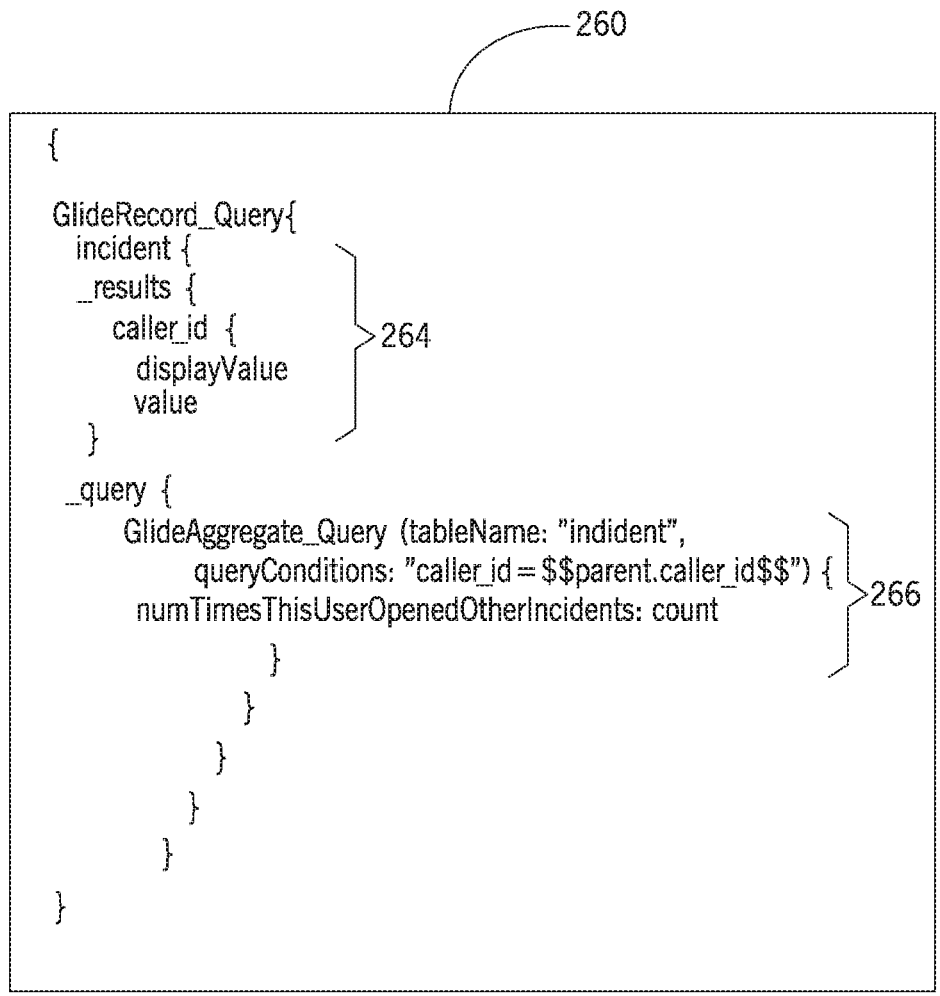
FIG. 11 is an example of a dependent GraphQL query, in accordance with embodiments of the present technique.
Figure 12:
FIG. 12 is a corresponding GraphQL response to the dependent GraphQL query of FIG. 11, in accordance with embodiments of the present technique.

An example of a multi-step dependent GraphQL query 260 is illustrated in FIG. 11, and the corresponding GraphQL response 262 is illustrated in FIG. 12. The example multi-step dependent GraphQL query 260 has an outer portion 264 (e.g., a first query) that, when executed, retrieves user information (e.g., "caller_id" data) from an "incident" table. The multi-step dependent GraphQL query 260 also includes an inner portion 266 (e.g., a separate, internal GraphQL query) that is repeatedly generated and executed based on the execution of the outer portion 264. For the illustrated example, the "queryConditions" argument in the inner portion 266 uses particular syntax (e.g., "$$parent.caller_id$$") that retrieves the current value of the "caller_id" field from the parent object associated with the outer portion 264. As such, the results 268 in the GraphQL response 262 includes "caller_id" records 270 for a number of users from an "incident" table retrieved by the outer portion 264. The results 268 further include a count 272 of the number of times each of these users has opened other incidents in the "incident" table, each of which is determined by a separate execution of the inner portion 266 using a different "caller_id" value. Accordingly, it is recognized that multi-step dependent GraphQL queries are, for example, useful for calculating aggregates at the same level of a field instead of at the top level of the query to make it easier to identify correlation between the data. It should be appreciated that, in the absence of a "$$parent.xxx$$" reference to data from the outer portion 264, the multi-step GraphQL query 260 would instead be described as a multi-step nested GraphQL query.

As such, present embodiments enable a single REST request to include any suitable number of GraphQL queries, including complex, multi-step GraphQL queries. By way of specific example, in an embodiment, a single REST request including a multi-step GraphQL query (e.g., a recursive GraphQL request) may request form metadata (e.g., data types, structures, formats) with a first portion, and then request the actual form data (e.g., values for the fields) using a second portion generated at the server-side. Indeed, using the disclosed GraphQL framework, all elements on a screen of a graphical user interface (GUI) presented on a client device (e.g., all metadata and values) may be received as the streamed response to the single REST request.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
    a data center hosting a representational state transfer (REST) server in communication with a client network, wherein the REST server includes a GraphQL schema describing tables and fields of a communicatively coupled database, and wherein the REST server is configured to:
    receive a REST request from a client device disposed on the client network, wherein the REST request includes a GraphQL query;
    open a streaming connection to the client device on the client network;
    output a beginning of a REST response to the client device via the streaming connection;
        process the GraphQL query based on the GraphQL schema to generate a GraphQL result and output the GraphQL result in a body of the REST response via the streaming connection; and output an end of the response via the streaming connection, wherein the REST response is in JavaScript Object Notation (JSON).

2. The system of claim 1, wherein, to process the GraphQL query, the REST server is configured to:
validate the GraphQL query against the GraphQL schema;
execute the GraphQL query against the database to retrieve information from the database; and
generate the GraphQL result based on the retrieved information.

3. The system of claim 1, wherein GraphQL query is a multi-step GraphQL query.

4. The system of claim 3, wherein the multi-step GraphQL query is a nested GraphQL query including an inner portion that is repeatedly generated and executed in a context of an outer portion.

5. The system of claim 4, wherein the nested GraphQL query is a dependent GraphQL query, and wherein the inner portion includes a reference to data from the context of the outer portion.

6. The system of claim 3, wherein the multi-step GraphQL query is a recursive GraphQL query comprising a first portion that generates and executes a second portion.

7. The system of claim 3, wherein the REST server is configured to reallocate memory storing a first portion of the GraphQL result associated with a first portion of the multi-step GraphQL query after streaming the first portion of the GraphQL result via the streaming connection.

8. The system of claim 1, wherein the REST request is received from a client device, and the streaming connection is a streaming connection to the client device, and the beginning, the body, and the end of the REST response are output to the client device via the streaming connection in JSON.

9. The system of claim 1, wherein the database is a configuration management database (CMDB) storing data regarding a plurality of configuration items (CIs).

10. A method of providing a GraphQL framework in a representational state transfer (REST) server, the method comprising:
validating and combining a plurality of sub-schemas to generate a GraphQL schema;
receiving a REST request from a client device disposed on a client network, wherein the REST request includes a plurality of GraphQL queries;
opening a streaming connection to the client device and streaming a beginning of a REST response to the client device;
processing a first GraphQL query of the plurality of GraphQL queries based on the GraphQL schema to generate a first GraphQL result and then streaming the first GraphQL result to the client device as a first portion of a body of the REST response;
processing a second GraphQL query of the plurality of GraphQL queries based on the GraphQL schema to generate a second GraphQL result and then streaming the second GraphQL result to the client device as a second portion of the body of the REST response; and
streaming an end of the REST response to the client device such that the REST response is in JavaScript Object Notation (JSON).

11. The method of claim 10, wherein the first GraphQL query is a dependent GraphQL query comprising an inner portion that is nested in an outer portion, and wherein processing the first GraphQL query comprises: referencing, in the inner query, a current item in the outer query.

12. The method of claim 10, wherein the first GraphQL query is a recursive GraphQL query comprising an outer portion that generates and executes an internal query, wherein streaming the first GraphQL result comprises streaming, to the client device, both the internal query and data retrieved by executing the internal query.

13. The method of claim 10, wherein the plurality of sub-schemas comprise: a GlideRecord sub-schema, a GlideAggregate sub-schema, and a sub-GlideDomain schema.

14. The method of claim 10, comprising:
reallocating a first memory space storing the first GraphQL result in response to streaming the first GraphQL result; and
reallocating a second memory space storing the second GraphQL result in response to streaming the first GraphQL result.

15. The method of claim 10, wherein, when a limit is reached while processing the first or second GraphQL query or while outputting the first or second GraphQL result, the method comprises:
discontinuing processing the first or second GraphQL query;
discontinuing streaming the first or second GraphQL result; and
streaming the end of the REST response to the client device such that the REST response is in properly formatted JSON.

16. The method of claim 15, wherein the limit comprises an execution time limit, an execution node output limit, an execution database query limit, or a maximum query depth limit, or a combination thereof.

17. A non-transitory, computer-readable medium storing instructions executable by a processor of a computing system to enable a representational state transfer (REST) server, the instructions comprising:
instructions to validate and combine a plurality of sub-schemas to generate a GraphQL schema that describes tables and fields of a database;
instructions to receive a REST request, and in response, to open a streaming connection and output a beginning of a REST response via the streaming connection;
instructions to process a first GraphQL query of the REST request based on the GraphQL schema to generate a first GraphQL result and to output the first GraphQL result via the streaming connection as a first portion of a body of the REST response;
instructions to reallocate memory storing the first GraphQL result;
instructions to process a second GraphQL query of the REST request based on the GraphQL schema to generate a second GraphQL result and to output the second GraphQL result via the streaming connection as a second portion of the body of the REST response;
instructions to reallocate memory storing the second GraphQL result; and
instructions to output an end of the REST response via the streaming connection, wherein the REST response is in JavaScript Object Notation (JSON).

18. The medium of claim 17, wherein the instructions comprise:
instructions to receive, from a client device associated with a user, an initial request to receive the GraphQL schema;
instructions to generate a partial GraphQL schema based on the GraphQL schema, an access control list (ACL), and the user; and instructions to output the partial GraphQL schema to the client device, wherein the client device is configured to introspectively query the partial GraphQL schema while the user creates the REST request.

19. The medium of claim 17, wherein the instructions comprise:
- instruction to determine that a limit has been reached while processing the first or second GraphQL query or while outputting the first or second GraphQL result, wherein the limit comprises an execution time limit, an execution node output limit, an execution database query limit, or a maximum query depth limit, or a combination thereof;
- instructions to discontinue processing the first or second GraphQL query;
- instructions to discontinuing streaming the first or second GraphQL result; and
- instructions to output an end of the REST response via the streaming connection.

20. The medium of claim 17, wherein the first or second GraphQL query is a nested, dependent, or recursive multi-step GraphQL query.

* * * * *